Oct. 31, 1967 G. M. THOMSON 3,350,717

PLURAL PEN RECORDER

Filed June 10, 1965 4 Sheets-Sheet 1

INVENTOR
GEORGE M. THOMSON

BY Beale and Jones
ATTORNEYS

Oct. 31, 1967 G. M. THOMSON 3,350,717

PLURAL PEN RECORDER

Filed June 10, 1965

4 Sheets-Sheet 2

INVENTOR
GEORGE M. THOMSON

BY Beale and Jones
ATTORNEYS

Oct. 31, 1967 G. M. THOMSON 3,350,717

PLURAL PEN RECORDER

Filed June 10, 1965

4 Sheets-Sheet 3

INVENTOR
GEORGE M. THOMSON

BY Beale and Jones
ATTORNEYS

Oct. 31, 1967 G. M. THOMSON 3,350,717
PLURAL PEN RECORDER
Filed June 10, 1965 4 Sheets-Sheet 4

INVENTOR
GEORGE M. THOMSON
BY Beall and Jones
ATTORNEYS 3,350,717
PLURAL PEN RECORDER George M. Thomson, Woodside, N.Y., assignor, by mesne assignments, to Central Station Signals, Inc., New York, N.Y., a corporation of New York Filed June 10, 1965, Ser. No. 462,905
12 Claims. (Cl. 346—49)

The present invention relates to electro mechanical signal recording devices for printing code signals on a tape. More particularly, this invention provides a recording device, or register, which is capable of printing the incoming signals from a plurality of different circuits on a paper tape one half inch wide.

With the increasing complexity of industrial and commercial establishments and the resulting increase in the cost of providing adequate protection against fire and burglary, more and more owners are turning to the use of electronic protection devices as being less expensive, more reliable and more sensitive than the usual watchmen and guards. Such electronic protection devices utilize censors of various types which detect smoke, air temperature or the like for automatic fire protection, or are actuated in response to open or broken doors, windows, locks and the like for automatic burglary and/or holdup detection. Such censors typically send out a series of coded warning signals upon actuation. These signals are sent to a central station where recording devices make a record of the incoming code. The watchman at the central station may then decipher the incoming signal to obtain information as to the type of condition being detected as well as its location. He may then call the fire department or take other appropriate action. In this manner, the single watchman can, from a remote location, monitor a large number of different buildings, offices and homes.

Many types of detectors are known which are suitable for such a system. These detectors may produce a coded signal in response to a condition or may be arranged to switch on pre-recorded signals which give the required information. The signals are carried on conventional telephone lines to the central station where they are recorded on pen recorders. In the prior art, only one or two circuits are monitored by each recording device at the central station. Although each telephone circuit may carry the signals from a number of detectors, the signals used by the prior art devices are such that the number of detectors per circuit must be somewhat limited in order to avoid the problem of overlap between signals from different sources. Such overlap prevents the watchman at the central station from distinguishing between simultaneously-received signals. These prior art devices utilize a sharp pulse type of signal having constant amplitude and duration which limits the information that can be transmitted by a single pulse.

Many prior art recorders are designed to run continuously in order to insure an instantaneous response to an incoming signal; however, this type of operation wastes a great deal of paper tape during those periods when no signals are being received. Further, this sort of operation does not permit the watchman on duty at the central station to distinguish an open line condition, for if a line should break, the only indicator would be a single pulse.

A danger in many prior devices is the fact that they utilize hand-wound spring-driven mechanisms which will not record when the spring is unwound or breaks. The present invention eliminates this possibility by providing an electrically-powered system wherein both the drive motor and the recording pens derive their power from the same source. This insures sufficient power to operate the drive motor whenever there is sufficient power to operate the recording pens. It will be apparent that a standby power supply may be provided to supplement the main source of energy.

In order to test prior art pen recording systems to determine whether the individual pens or perforating mechanisms were operable, it was necessary to operate each circuit associated with a register, resulting in numerous meaningless dashes or perforations on the tape. With the present invention, the continuous lines which the recorder produces provides a continuous record of writability, while the operation of any one circuit associated with the register provides a test of all the pens of that register.

Prior art pen holding mechanisms are relatively complex devices which often consume a considerable amount of time when it becomes necessary to replenish an ink supply or when it is desired to change from one color to another. The present invention utilizes a pen holder which is extremely simple, permitting quick replacement of pens when it is desired to change colors, or when the supply of ink is exhausted.

It is therefore an object of the present invention to overcome the disadvantages of the prior art by providing an electrically-driven pen register having a plurality of pens, all of which write simultaneously and inscribe continuous lines on a record tape upon receipt of a single input signal.

It is another object of the present invention to provide a pen register which permits several pens to record simultaneously on a single, one-half inch wide tape, thus materially reducing the number of recorder devices needed at a central station for a given number of incoming circuits or, conversely, increasing the number of telephone input circuits that can be used with a given number of registers.

An additional object of the invention is to provide a pen register having an improved recording pattern. More particularly, it is an object of the invention to provide a recording pattern which permits more information to be transmitted than is now possible with the conventional pulse type of pattern.

Another object of the invention is to provide a pen register that produces a constant indication of an open line condition so that an observer can tell not only when the open line condition occurred but whether it still exists.

Another object of the present invention is to provide a pen recording device in which the drive motor is actuated only upon the receipt of an incoming signal; the motor then runs for a pre-determined length of time before stopping again.

Another object of the invention is to provide motor control circuits for a pen recorder in which incoming signals on an input line or a plurality of input lines will start the motor, said circuit utilizing only a single motor start relay.

An additional object of the invention is to provide pen holder means for a register which are adapted to receive standard ball point pen refills, whereby changing of ink colors or replacement of an exhausted ink supply may easily be accomplished.

An additional object of the invention is to provide a pen register which permits the recording of many signals per machine and thus reduces the amount of space needed to monitor a given number of stations.

In accordance with the present invention, there is provided a recording device having a housing, bracket means mounted on the outside of the housing to carry a supply of recording tape, and table means on the outside of said housing across which said paper tape is drawn. A motor mounted within said housing is arranged to draw the tape across said table. Pen holder means are mounted on the outside of said housing and perpendicular to said table, each of said pen holders being arranged to mount the ball point pen refill above said table and in contact with said tape. Driving means are mounted inside said housing and extend therethrough to drive said pen holders in a direction perpendicular to the travel of said tape. Electric circuit means are located within said housing to receive input signals from sources of coded signals and are adapted to energize the motor and one or more of said pen-driving means upon receipt of such a signal to trace a record of the signals. Further means are provided to de-energize said motor a pre-determined length of time after the receipt of such a coded signal. This recording device responds to and registers a square wave pulse pattern which transmits information by means of pulse position as well as pulse length, thus permitting more detector units per telephone circuit to be monitored without risking undecipherable overlapping of signals.

The various features and objects of the invention will best be understood and appreciated from the following detailed description of a preferred embodiment thereof, selected for purposes of illustration and shown in the accompanying drawings, in which.

Figure 1:
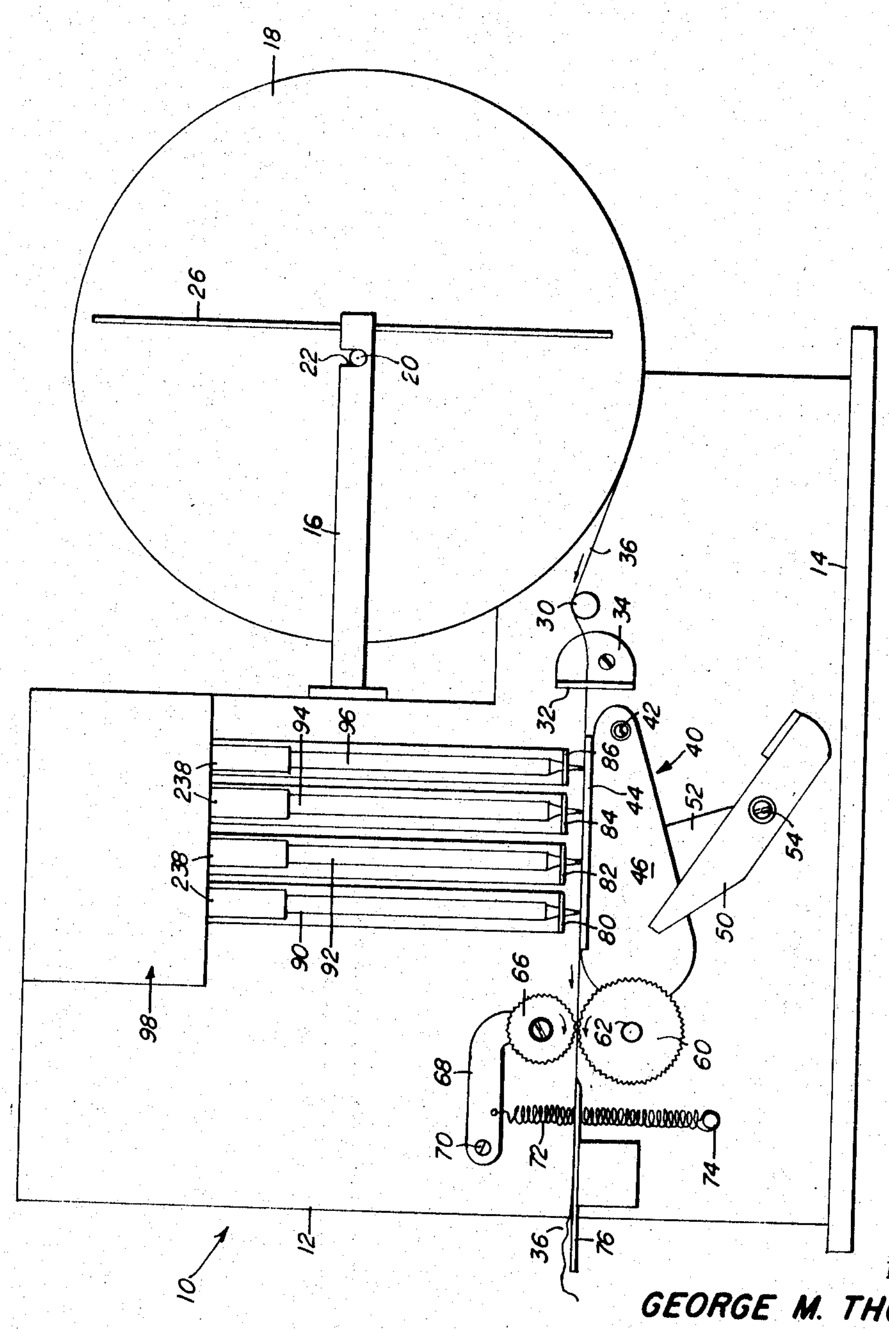
FIG. 1 is a side elevational view of the pen register showing the location and arrangement of the pen holders.
Figure 2:
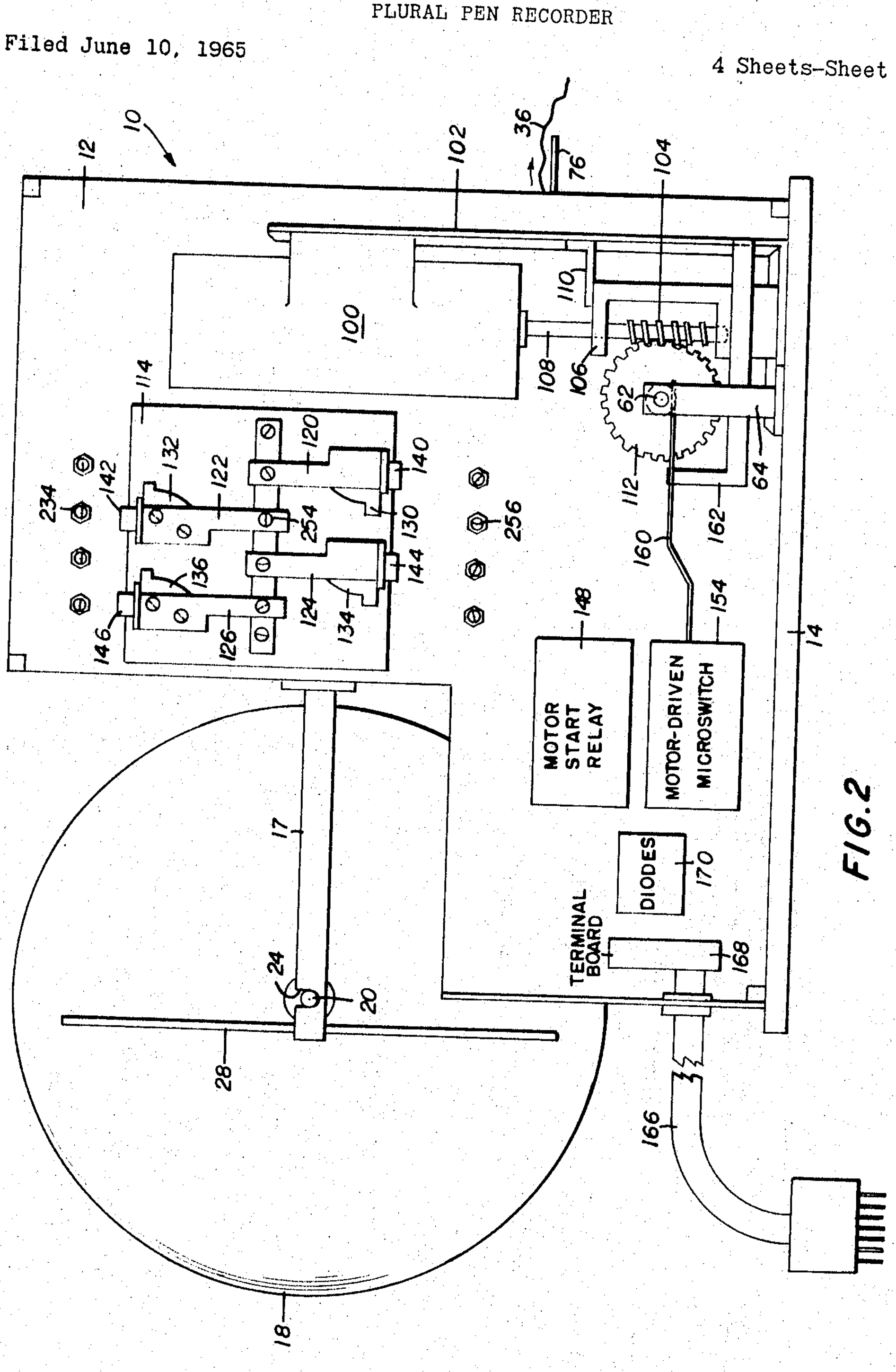
FIG. 2 is a side elevational view of the device of FIG. 1 taken from the opposite side of the register and with the housing cover removed, certain parts of the electrical circuitry being shown in diagrammatic form.

Referring now to the specific embodiment of FIGS. 1 and 2, the pen register of the present invention is generally indicated by the numeral 10 and includes a housing 12 mounted on base member 14. The housing may be constructed of any suitable material having sufficient strength to carry the motor and the associated drive mechanism and preferably is of chrome-plated brass. Mounted on the back of the housing in any convenient manner is a bracket comprised of arms 16 and 17 adapted to carry a roll 18 of tape such as ticker tape paper or the like. Roll 18 is carried by a shaft 20 which rests in notches 22 and 24 in arms 16 and 17, respectively, for rotation as the paper is withdrawn from the roll. Guide bars 26 and 28 mounted in the ends of the bracket arms 16 and 17 hold the roll in a vertical position so that the paper will feed out properly.

As the paper tape 36 is withdrawn from roll 18, it passes over a guide roller 30 and passes through a guide 32 in guide plate 34 and onto the surface of a paper table 40. The paper table is mounted so as to be pivotable about a mounting screw 42.

Paper table 40 includes a flat, substantially horizontal upper portion 44 and a substantially vertical cam-shaped portion 46. It is adapted for pivotal motion about the pivot point 42 in response to actuation of a catch means 50. The catch means 50 includes a camming portion 52 which engages the cam-shaped portion 46 of paper table 40. The catch is mounted for pivotal motion around a pivot 54, which may be a mounting screw, so that counterclockwise motion of the catch (FIG. 1) will release paper table 40.

The paper tape is drawn across table 40 by a serrated drive wheel 60 mounted on a shaft 62 which extends into the housing. The shaft may be journaled for rotation in support brackets, such as that shown at 64 (FIG. 2), or may be journaled at one end in a bracket 64 and, adjacent the serrated drive wheel, in a journal bearing mounted in the housing itself. A spring-biased pressure roller 66 is mounted adjacent the drive wheel 60 on the outside of the housing by means of a movable arm 68 which pivots about a pivot point such as screw 70. Spring 72 is connected in tension between a fixed point 74 and the mounting arm 68, to urge the pressure roller into engagement with the paper tape 36 as it passes over drive wheel 60. The paper is then fed across a support table 76 which carries the tape away from the register to a location where it may be read by an observer.

Mounted on the outside of the housing, as shown in FIG. 1, above and perpendicular to the paper table 40, are a plurality of pen holders 80, 82, 84, and 86, each pen holder being adapted to carry a ball point pen refill or the like in printing engagement with the paper table 40. The pens are arranged so as to be spaced across the width of the paper 36; that is, pen holder 80 is located very close to housing 12 so as to produce a line near the inside edge of tape 36, while holder 82 is spaced out from the housing a small distance, holder 84 is spaced a further distance from the housing and holder 86 still further so that the latter produces its line near the outside edge of the paper table. Pens 90, 92, 94 and 96 therefore inscribe spaced parallel lines on the paper tape as it is drawn across the table 40. The holders are so arranged that replacement of the pens becomes a simple matter and is accomplished by releasing catch 50 to permit table 40 to pivot downwardly away from the pens. The pens may then be removed merely by lifting them upwardly against their individual bias springs and swinging the pen point outwardly, as will be described in greater detail below.

Figure 3:
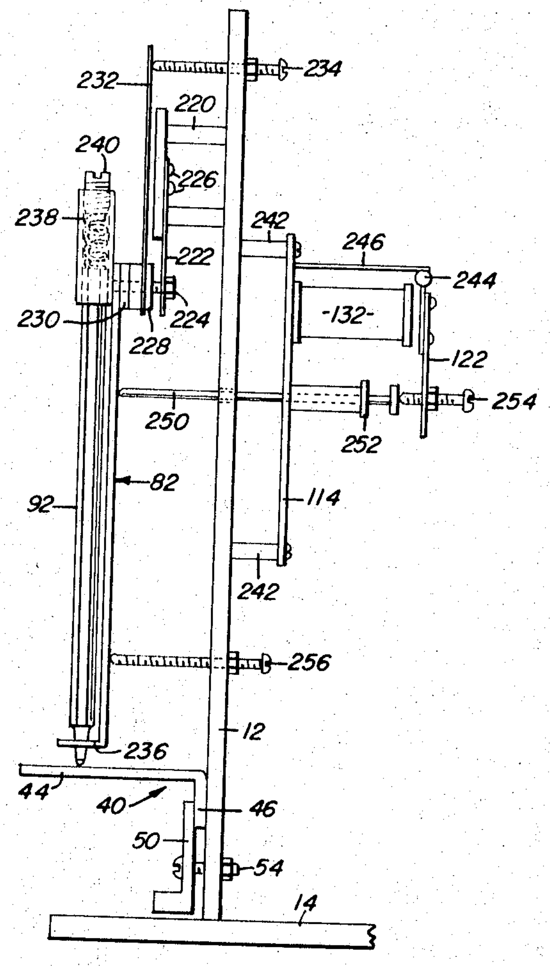
FIG. 3 is a diagrammatic showing of the pen register of the invention, showing the construction of a single pen holder and its associated armature mechanism.

The pen holder mounting apparatus, which is shown in greater detail in FIG. 3, is, in normal usage, covered by a protective cover such as that indicated at 98 in FIG. 1.

Referring now to FIG. 2, there is shown mounted within the housing a drive motor 100 which may, for example, be a 12 volt D.C. motor or its equivalent. The motor is mounted to the housing and to the base by suitable bracket means 102. A worm gear assembly comprised of worm gear 104 and a mounting bracket 106 is driven by the motor shaft 108. Worm gear bracket 106 is attached to the motor bracket 102 by appropriate means such as a support arm 110. The worm gear drives a worm wheel 112 which is mounted on shaft 62 for rotation therewith. The rotation of shaft 62 by the worm gear and worm wheel is preferably at an 80–1 reduction, providing a simple drive mechanism which has greater power than is available for drawing paper tapes through prior systems.

As has been described above, each pen holder is positioned by an armature means which moves in response to the energization of a coil to drive a thrust pin which extends through the housing and contacts the pen holder. An armature mounting plate is located inside the housing 12 adjacent to the location of the pen holders. As illustrated in FIG. 2, four armature members 120, 122, 124, and 126 are mounted on the armature mounting plate along with their corresponding excitation coils 130, 132, 134 and 136. It should be noted that wiring for the several excitation coils is not shown in the diagram of FIG. 2, but it is to be understood that these coils are connected in the manner shown in the schematic diagram of FIG. 4. Associated with each of these coils is a motor circuit relay contact switch shown diagrammatically at 140, 142, 144, and 146, which contact switches are closed upon excitation of their respective coils. These switches are connected in the motor circuit in parallel with the main motor start relay 148 to insure that the motor circuit is closed upon receipt of a coded input signal, and that the motor will run upon receipt of such signal. These auxiliary contacts are not essential to the operation of the system and may be eliminated if desired; however, they provide a safety factor in the event that motor start relay 148 should fail for some reason.

The motor start relay 148 is comprised of a relay coil 150 (FIG. 4) and associated relay contacts 152, and provides the energization path for motor 100 when an input signal is received. The motor start relay is mounted at a suitable location within housing 12 and is shown diagrammatically in FIG. 2 for purposes of illustration.

Also enclosed within housing 12 is a microswitch 154, shown diagrammatically in FIG. 2, which is comprised of a pair of contacts 156 and 158 (FIG. 4) and a spring-biased lever arm 160. Microswitch 154 acts as a timing mechanism for motor 100 and serves to open the motor circuit after a pre-determined number of revolutions. The microswitch is mounted at a convenient location within housing 12 and arranged so that lever arm 160 reaches the drive shaft 62 for motion therealong. Microswitch contacts 156 and 158 are held in a normally opened condition by a biasing spring 162 (FIG. 2) which is mounted at one end on motor bracket 102, its free end being in contact with lever arm 160. Lever arm 160 is moved along the axis of shaft 62 during rotation of the shaft by any convenient means to operate the switch. In a preferred embodiment, the shaft is provided with a helical groove extending from worm wheel 112 to bracket 64. This groove may be cut into the shaft or may be in the form of a coil spring mounted on the shaft for rotation therewith. The lever arm is so located as to be in contact with the groove and to be driven along the shaft as it is rotated.

Upon energization of the motor start relay 148, contacts 156 and 158 of microswitch 154 are closed, causing lever arm 160 to be moved against the bias of spring 162 to its closed position. At the same time, the motor start switch 152 is closed and motor 100 starts to rotate. As motor 100 runs, worm wheel 112 drives shaft 62 and the lever arm 160, following the helical groove in shaft 62, slowly moves toward its opened position. After a pre-determined number of revolutions, contacts 156 and 158 are opened by the lever, and the motor 100 comes to a stop.

The coded input signals from the various telephone circuits which feed the register are fed into the device through a cable 166 to a terminal board 168 conveniently mounted within housing 12. Appropriate leads extend from this terminal board to the several armature excitation coils, 130, 132, 134 and 136, and also through diodes 170 to the motor start relay 148 of the motor control circuit, as shown in the circuit diagram of FIG. 4.

Figure 4:
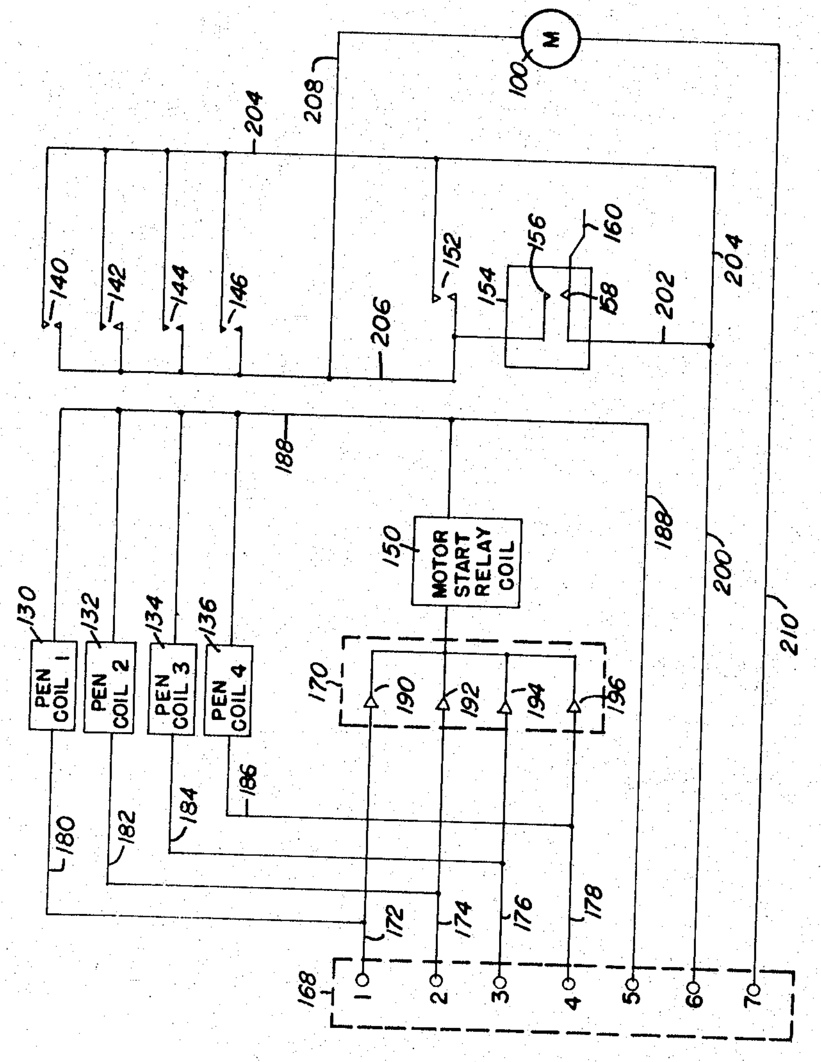
FIG. 4 is a circuit diagram of the electrical circuitry used in the operation of the pen register.

Referring now to FIG. 4, 168 refers to the terminal board to which the input cable for the register is connected. The input cable carries not only the coded signals from the telephone circuits, which signals are connected to terminals 1–4, but also carries the current from a power supply to the motor energization circuit. The power supply is connected to terminals 6 and 7 of the board. Terminal 5 is the ground connection for the telephone input circuits. Coded input signals from the telephone circuits are fed to the pen energization coils 130, 132, 134, and 136 through lines 172, 174, 176, 178, 180, 182, 184, and 186. The coils are connected to ground terminal 5 through line 188. The signals appearing on lines 172, 174, 176, and 178 are fed through respective diodes 190, 192, 194 and 196 to the motor start relay coil 150 and thence to line 188 and ground terminal 5.

Appearance of a coded input signal on any one of terminals 1–4 will energize the corresponding pen excitation coil as well as energizing the motor start relay coil 150. The use of diodes 170 eliminates feedback between the circuits and permits use of a single motor start relay coil in conjunction with a plurality of telephone input circuits. Energization of relay coil 150 closes its contacts 152 and closes microswitch 154, which switches are in parallel. This completes the motor energization circuit from terminal 6, line 200, line 202 or 204, line 206 and line 208 to motor 100 and thence through line 210 back to terminal 7. At the end of the coded input signals, the coil 150 releases contacts 152 which then open. However, the motor continues to run for a pre-determined number of revolutions, being energized through the closed contacts of microswitch 154. Thus, a pre-determined time after the receipt of the last coded input signal at any of terminals 1–4, microswitch 154 will open and the motor will stop.

Auxiliary switches 140, 142, 144, and 146 are connected in parallel with the main motor start contact 152 and supplement its action as described above, closing upon receipt of a coded signal on a corresponding circuit line, and opening at the end of such a signal.

FIG. 3 shows the detailed construction of a pen holder mechanism constructed in accordance with the present invention. As has been described, the pen holder 82 is mounted on a wall of housing 12 perpendicular to and in contact with the horizontal portion 44 of paper table 40 when the table is locked in its upward, or recording, position. The pen holder is fastened to housing 12 by means of a bracket 220 which may be connected to the housing in a convenient manner. The holder is attached to the bracket by means of spring hinge 222 and a fastening bolt or screw 224. Spring hinge 222 may be fastened to the bracket by any suitable means such as screws 226. Suitable spacing washers 228 and 230 are carried by fastening screw 224 to properly position pen holder 82 over the paper table. Also carried by screw 224 is an upwardly extending return spring 232 which extends above mounting 220 where it is contacted by a return spring adjusting screw 234 extending through the wall of housing 12.

Pen holder 82 includes a lower portion 236 through which the point of the pen protrudes to contact the paper tape. This lower portion includes an aperture through which the pen point can move freely but which is sufficiently small to prevent the body of the pen from passing through. The upper portion of the holder includes a housing for the pen head as indicated at 238. This housing is adapted to receive the upper end of the ball point pen refill 92 and includes an internal spring which provides the downward pressure on the pen necessary to produce an ink line on the paper tape passing over table 40. A pen pressure adjusting screw 240 is provided to control the pressure of the pen.

The movable armature driving means for moving the pen holder in response to incoming signals is mounted on the wall of housing 12 opposite to its corresponding pen holder as has been described. As shown in FIG. 3, which is a diagrammatic showing of a single pen holder mechanism, armature mounting plate 114 is fastened to housing 12 by suitable screws and spacers 242. Armature 122 is fastened to the mounting plate by a hinge 244 and bracket 246 and transmits its motion to the pen holder through a thrust pin 250. The thrust pin is held in position by a thrust pin guide plate 252 and extends through the guide plate, the mounting plate 114 and the wall of housing 12 to contact the pen holder 82. Contact between the armature 122 and thrust pin 250 is made by means of an adjusting screw 254 which is carried by armature 122 and which permits adjustment of the length of travel of the thrust pin in response to energization of coil 132.

The final adjustment for the pen holder is the tracking screw 256 which extends through the wall of housing 12 and contacts pen holder 82. This screw controls the return point of the pen holder upon de-energization of coil 132 and thus establishes the tracking point of its associated pen on the tape.

Basically, the operation of the pen holder mechanism of FIG. 3 is as follows. Upon the receipt of an input coded signal on the appropriate telephone circuit, the coil 132 will be energized, attracting armature 122. The motion of the armature drives the thrust pin against the pen holder and moves the point of the pen away from housing 12 by a distance proportional to the length of travel of the thrust pin. The pen holder pivots on spring hinge 222 and, at the same time, bends the return spring 232 against its adjusting screw 234. This motion of the pen holder produces a displacement in the line being drawn on the paper tape. This displacement is illustrated in FIG. 5A at the point 260, the normal paths of the four pens of the register being illustrated at 262, 264, 266, and 268. At the end of the coded input signal, coil 132 is deenergized and releases armature 122; the pressure exerted by thrust pin 250 is released and the pen holder is returned to its initial position by return spring 232. Tracking screw 256 prevents over-travel of the pen holder. The release point of the armature is indicated in FIG. 5A at 270. As may be seen, the trace may return to its initial position at a different rate than that of its original deviation. This is due to the fact that the return spring 232 normally does not exert as great a force as thrust pin 250 exerts upon energization of coil 132. The particular shape of the trailing edge of this trace thus is dependent upon the strength of the return spring 232; the stronger the spring, the sharper will be the return to the original trace.

Figure 5:
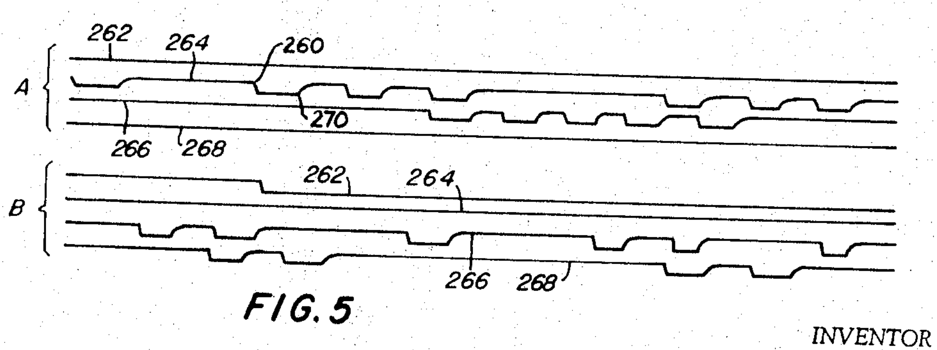
FIG. 5 illustrates typical tracings obtained from the device of the invention upon receipt of coded signals.

The traces of FIG. 5 shown at A and B are samples of types of coded signals that may be recorded by the register of the present invention. As illustrated in FIG. 5A, a first pulse received on the trace 264 causes the drive motor to be turned on and moves the tape past the several pens. The sequence of signals received by the telephone circuits corresponding to trace 264 is shown as being a single pulse followed by a space, then three pulses, another space and three more pulses. This sequence of signals may have any pre-determined meaning desired and thus may be used to indicate a condition such as fire, smoke or burglary or may be used to indicate a combination of these conditions. As shown in FIG. 5A a series of pulses has been recorded on trace 266 starting at a time subsequent to the initial pulse shown and recorded by trace 264. Trace 266 represents a different telephone circuit and may carry information entirely distinct from that being recorded on trace 264. There is no interference between the two traces and a watchman at the central station can quickly and easily decipher the code being recorded on both traces. The tape will continue to run until the predetermined length of time after the last signal is received on any of the four circuits, at which time the motor will stop. As shown in FIG. 5A, no signals have been received by the circuits corresponding to traces 262 and 268. FIG. 5B shows another sampling of traces produced by the present device. In this instance the initiating pulse is not shown. Trace 262 illustrates the condition that exists on occurrence of an open line in a telephone circuit. As shown, the pen is deflected and remains in that position until the open circuit is repaired or disconnected. While the open condition exists, motor 100 continues to run and the register records this condition. If the tape is provided with a time indicator then a positive indication is given of how long the open line condition has existed. This may be differentiated from the prior art devices which give only a short pulse indication of when the circuit is opened and do not show whether the condition has been cured.

Since each transmitting station is provided with a distinctive code it is possible to connect a large number of transmitters to each telephone circuit; as many as 250 separate transmitters may be used for each circuit, giving a total of 1,000 transmitters for a single register. By providing each transmitter with a separate code, it remains possible to decipher the incoming signals even if two separate signals arrive on the same telephone circuit and are recorded by a single pen. The signals will be superimposed on each other and will produce a distinctive trace and can easily be decoded by an experienced operator. Alarms or signal lights may be provided for each register or for each group of registers to indicate when a machine is operating and to call the operator's attention to it.

Although the specific embodiment of the invention described herein includes four pen holders in a single register, it will be apparent that the basic concepts of this invention can be applied to registers utilizing a larger number of pens. For example, a considerable savings in space and equipment might be effected through the use of a twenty-pen register which would only require one drive motor. Various other modifications of this embodiment will be apparent to persons skilled in the art.

Thus, there has been provided a mechanical signal recording device for printing code signals on a tape to give indications of conditions at remote stations. The register of this invention is compact and produces a distinctive trace which is easily deciphered by an operator and which produces positive indication of an open circuit condition. The operating circuitry for the register is extremely simple, permitting a machine to remain at rest until the input signal is received, at which time the motor starts to draw the paper tape across the supporting table, a feature which permits savings in the amount of paper used by the machine. However, it is to be understood that the scope of the present invention is not limited to the specific embodiment described above but includes the various alternatives and modifications that fall within the true spirit and scope of the invention as defined by the following claims.

I claim:

1. In a central station alarm system, a recording device comprising housing means; a plurality of movable pen recorders pivotally mounted on said housing; means for supplying recording tape to said pen recorders; table means pivotally attached to said housing; electric drive motor means within said housing for drawing said recording tape across the upper surface of said table means, said pen recorders being adjacent to and in writing relationship with the tape on the surface of said table, whereby motion of said recording tape will cause all of said pens to inscribe traces thereon; thrust means for moving each of said pen recorders in a direction substantially perpendicular to the direction of motion of said tape, each said thrust means including an excitation coil mounted within said housing, a thrust pin extending through said housing to contact its corresponding pen recorder, and armature means responsive to energization of said excitation coil to drive said thrust pin against said pen recorder to move said recorder; and signal receiving means responsive to coded input signals to energize both the selected thrust means and said electric drive motor means, said selected thrust means being deenergized at the end of its input signal, and said electric drive motor means remaining energized a predetermined number of revolutions after the end of all coded input signals.

2. The recording device of claim 1, wherein said signal receiving means includes relay means for energizing said electric drive motor, said relay means including a relay coil connected in parallel with each of said excitation coils and relay starting contacts in series with said electric drive motor.

3. The recording device of claim 2, wherein said signal receiving means further includes auxiliary starting contacts in parallel with said relay starting contacts, said auxiliary contacts being closed by energization of one of said excitation coils to energize said drive motor.

4. The recording device of claim 2, wherein said signal receiving means further includes diode means in series with said relay coil to prevent feedback between said excitation coils.

5. The recording device of claim 1, wherein each of said movable pen recorders includes a pen, pen holder means adapted to releasably grip said pen, and regulating means within said holder for varying the writing pressure of said pen against said tape.

6. The recording device of claim 5, wherein said pen holder means is mounted on said housing by means of a spring hinge and is spring-biased against movement by said thrust pin, said bias spring serving to return said pen holder to its initial position when said thrust means is not actuated; means for adjusting the tension of said bias spring; and tracking adjustment means for setting the original position of said pen holder; each of said pen holders being so disposed as to inscribe spaced parallel lines on said tape as it is drawn across said table, the energization of the excitation coil of a selected thrust means causing the corresponding pen recorder to inscribe a square wave pulse pattern on said tape.

7. In a central station alarm system, a pen register capable of recording coded signals received from a plurality of line circuits, said coded signals corresponding to detected conditions at remote locations, said pen register including a housing; a pen recorder for each of said line circuits mounted on said housing; a recording tape; means including drive motor means in circuit with a pair of starting contacts for drawing said tape past said pen recorders; relay coil means energizable by a coded signal on any of said line circuits to close said starting contacts to start said motor; means responsive to such a coded signal to move the pen recorder corresponding to the line circuit on which said signal was received, said pen recorder returning to its initial position at the end of said signal whereby a square wave pattern corresponding to said coded signal is inscribed on said recording tape; and switch means responsive to the rotation of said drive motor for deenergizing said motor a predetermined number of revolutions after the receipt of the last of said coded signals, whereby said pen register is activated only during receipt of coded signals and for a predetermined period there after.

8. The system of claim 7, wherein each of said pen recorders includes a pen, pen holding means for releasably gripping said pen, resilient means for adjusting the writing pressure of said pen, spring hinge means for pivotally mounting said pen holding means on said housing, and means for adjusting the position of the trace inscribed by said pen with respect to said tape; and wherein said means responsive to a coded signal on a line circuit comprises an excitation coil and associated armature mounted within said housing, and thrust pin means responsive to the motion of said armature upon energization of said excitation coil to move the pen recorder corresponding to said line circuit.

9. The system of claim 8, further including auxiliary starting contacts associated with the excitation coil of each of said pen recorders, said auxiliary contacts being connected in parallel with said starting contacts to insure operation of said motor upon receipt of a coded signal.

10. The system of claim 9, wherein said relay coil means is connected in parallel with each of said excitation coils, and further including diode means in circuit with said relay coil means for isolating said excitation coils.

11. The system of claim 10, wherein occurrence of an open line condition in any of said line circuits will activate said drive motor and the corresponding pen recorded to provide a continuous record of the existence and duration of said open line condition.

12. The system of claim 11, wherein each said line circuit is capable of receiving coded signals from a plurality of remote locations; the corresponding pen recorder responding to each coded signal to inscribe a square wave pulse, the position and duration of which provides information about the detected condition.

References Cited

UNITED STATES PATENTS

| | | | |
|---|---|---|---|
| 1,638,657 | 8/1927 | Cox | 346—49 X |
| 1,907,096 | 5/1933 | Angus | 346—49 X |
| 2,182,339 | 12/1939 | Hallden | 346—79 |
| 2,369,521 | 2/1945 | Bates | 346—79 |
| 2,392,876 | 1/1946 | Potter et al. | 346—79 |
| 2,412,639 | 12/1946 | Traugott | 346—136 X |
| 2,698,217 | 12/1954 | Ford | 346—119 X |

RICHARD B. WILKINSON, *Primary Examiner.*

J. W. HARTARY, *Assistant Examiner.*